(12) United States Patent
Park

(10) Patent No.: US 10,187,556 B2
(45) Date of Patent: Jan. 22, 2019

(54) CAMERA MODULE AND ALIGNMENT METHOD

(71) Applicant: LG INNOTEK CO., LTD., Seoul (KR)

(72) Inventor: Seung Ryong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/114,641

(22) PCT Filed: Jan. 26, 2015

(86) PCT No.: PCT/KR2015/000792
§ 371 (c)(1),
(2) Date: Jul. 27, 2016

(87) PCT Pub. No.: WO2015/115764
PCT Pub. Date: Aug. 6, 2015

(65) Prior Publication Data
US 2016/0352985 A1    Dec. 1, 2016

(30) Foreign Application Priority Data

Jan. 28, 2014  (KR) .......................... 10-2014-0010592

(51) Int. Cl.
*H04N 5/225* (2006.01)
*G03B 17/02* (2006.01)
*G02B 7/02* (2006.01)
*G02B 27/00* (2006.01)

(52) U.S. Cl.
CPC ........... *H04N 5/2254* (2013.01); *G02B 7/022* (2013.01); *G03B 17/02* (2013.01); *H04N 5/2253* (2013.01); *H04N 5/2257* (2013.01); *G02B 27/0006* (2013.01); *H04N 5/2252* (2013.01)

(58) Field of Classification Search
CPC .. H04N 5/2254; H04N 5/2253; H04N 5/2257; H04N 5/2252; G02B 7/022; G02B 27/0006; G03B 17/02
See application file for complete search history.

(56) References Cited

U.S. PATENT DOCUMENTS

| 7,423,665 | B2 * | 9/2008 | Ray | ........................... B60R 1/00 348/113 |
| 8,988,602 | B2 * | 3/2015 | Speltz | .................. H04N 5/2254 348/340 |
| 2005/0007484 | A1 * | 1/2005 | Tan | ...................... H04N 5/2254 348/340 |

(Continued)

FOREIGN PATENT DOCUMENTS

KR  10-2007-0109475 A   11/2007
KR  10-2009-0017843 A    2/2009

(Continued)

*Primary Examiner* — Gevell Selby
(74) *Attorney, Agent, or Firm* — Birch, Stewart, Kolasch & Birch, LLP

(57) ABSTRACT

A camera module according to one embodiment of the present invention comprises: a substrate; an image sensor arranged on the substrate; a lens housing, which is arranged on the substrate, and in which a lens is coupled; an elastic member arranged between the substrate and the lens housing; and a plurality of fastening members which fasten the substrate and the lens housing.

12 Claims, 3 Drawing Sheets

(56) References Cited

U.S. PATENT DOCUMENTS

| | | | |
|---|---|---|---|
| 2006/0056077 A1* | 3/2006 | Johnston | H04N 5/2254 |
| | | | 348/E5.028 |
| 2007/0264002 A1 | 11/2007 | Lee | |
| 2009/0324213 A1* | 12/2009 | Wang | G02B 7/026 |
| | | | 396/529 |
| 2010/0205793 A1 | 8/2010 | Ko et al. | |
| 2010/0253834 A1* | 10/2010 | Ogane | H04N 5/2253 |
| | | | 348/374 |
| 2013/0162894 A1* | 6/2013 | Lee | H04N 5/225 |
| | | | 348/373 |
| 2015/0181086 A1* | 6/2015 | Pahlitzsch | H04N 5/2252 |
| | | | 348/374 |

FOREIGN PATENT DOCUMENTS

| | | |
|---|---|---|
| KR | 10-2009-0047307 A | 5/2009 |
| KR | 10-2010-0010318 A | 2/2010 |
| KR | 10-2010-0093282 A | 8/2010 |

\* cited by examiner (a) UPPER SURFACE   (b) LOWER SURFACE

CAMERA MODULE AND ALIGNMENT METHOD

CROSS REFERENCE TO RELATED APPLICATIONS

This application is the National Phase of PCT International Application No. PCT/KR2015/000792, filed on Jan. 26, 2015, which claims priority under 35 U.S.C. 119(a) to Patent Application No. 10-2014-0010592, filed in the Republic of Korea on Jan. 28, 2014, all of which are hereby expressly incorporated by reference into the present application.

TECHNICAL FIELD

The present disclosure relates to a camera module, and more particularly, to a camera module capable of being actively aligned.

BACKGROUND ART

Nowadays, as camera technology is being developed, utility of a camera is also being widened, and more precise manufacturing of a camera is being demanded.

Particularly, high precision of an alignment between a lens and a sensor included in a camera is demanded, and for this, an active alignment and the like are being tried.

Two to six degrees of freedom are required in an active alignment. When tilting is included in the active alignment, an epoxy application method and the like are used. The epoxy application method is a method for applying epoxy between a substrate and a lens housing. In this method, an alignment process is performed after epoxy is applied and, when the alignment is finished, the epoxy is hardened and fixed.

In the case of the epoxy application method, since the substrate and the lens housing are supported only with epoxy without a mechanical support structure therebetween, there is a disadvantage in that the method is vulnerable to vibration, impact, etc.

DISCLOSURE

Technical Problem

The present disclosure is directed to providing a camera module capable of being actively aligned.

Technical Solution

According to an embodiment of the present disclosure, a camera module includes a substrate, an image sensor arranged on the substrate, a lens housing arranged on the substrate and into which a lens is coupled; an elastic member arranged between the substrate and the lens housing, and a plurality of fastening members that fasten the substrate and the lens housing to each other.

The elastic member may include a rubber material.

The elastic member may have a ring shape.

The plurality of fastening members may couple the substrate and the lens housing to each other at different positions.

The fastening members may have a screw shape.

A plurality of through-holes may be formed at each of the substrate and the lens housing, and the plurality of fastening members may be fastened by passing through the plurality of through-holes.

The substrate and the lens housing may be spaced apart by the elastic member.

The lens housing may include a support part that supports the lens, and may further include a waterproof member arranged between the lens and the support part.

The support part may protrude toward an inside of the lens housing.

The camera module may further include a molding member that fixes the plurality of fastening members.

According to an embodiment of the present disclosure, an alignment method of a camera module includes arranging an elastic member between an image sensor arranged on a substrate and a lens housing into which a lens is coupled, moving at least one of the substrate and the lens housing toward an optic axis (OA), rotating at least one of the substrate and the lens housing in a direction perpendicular to the OA, and fastening the substrate and the lens housing to each other using a plurality of fastening members.

A focus may be aligned in the moving of at least one of the substrate and the lens housing toward the OA.

An x-y offset may be aligned in the rotating of the at least one of the substrate and the lens housing in the direction perpendicular to the OA.

A tilt may be aligned by adjusting the fastening of the fastening members.

The method may further include fixing the fastening members using a molding member.

Advantageous Effects

According to an embodiment of the present disclosure, a camera module is not only capable of being actively aligned but also has a coupling structure that is resistant to vibration and impact.

MODES OF THE INVENTION

Figure 1:
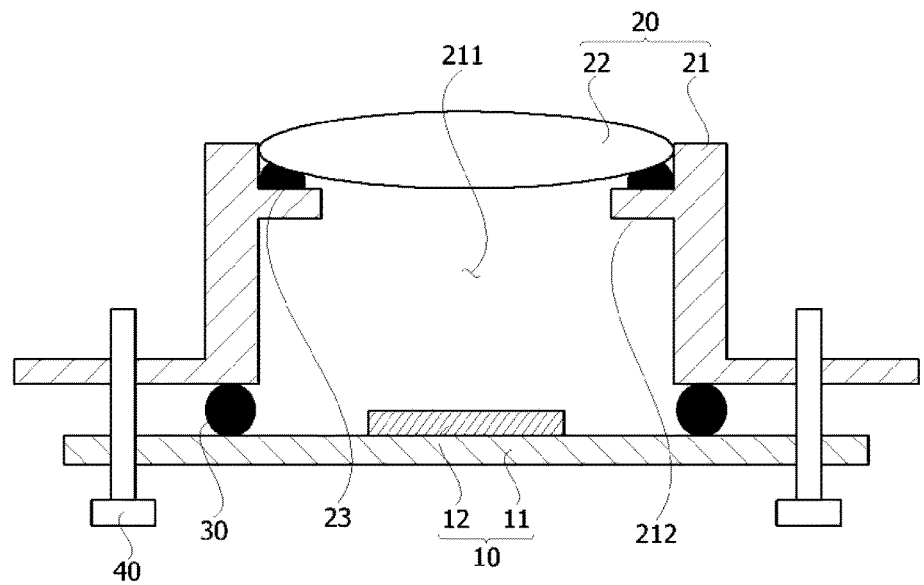
FIG. 1 is a lateral cross-sectional view schematically illustrating a camera module according to an embodiment of the present disclosure.

Since various modifications may be made to the present disclosure and the present disclosure may have various embodiments, particular embodiments will be illustrated in the drawings and described. However, this does not limit the present disclosure to the particular embodiments, and all modifications, equivalents, and substitutes included in the spirit and scope of the present disclosure should be construed as belonging to the present disclosure.

Terms including ordinals such as first and second may be used to describe various elements, but the elements are not limited by the terms. The terms are only used for the purpose of distinguishing one element from another element. For example, a second element may be referred to as a first element while not departing from the scope of the present disclosure, and likewise, a first element may also be referred to as a second element. The term and/or includes a combination of a plurality of related described items or any one item among the plurality of related described items.

In addition, the suffixes "module" and "part" of elements used in the description below are assigned or used only in consideration of the ease of writing the specification and do not have meanings or roles distinguished from each other.

When it is mentioned that a certain element is "connected" or "linked" to another element, although the certain element may be directly connected or linked to the other element, it should be understood that another element may exist therebetween. On the other hand, when it is mentioned that a certain element is "directly connected" or "directly linked" to another element, it should be understood that other elements do not exist therebetween.

Terms used in the application are merely used to describe particular embodiments and are not intended to limit the present disclosure. A singular expression includes a plural expression unless the context clearly indicates otherwise. In the application, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

Unless otherwise defined, all terms including technical or scientific terms used herein have the same meaning as commonly understood by one of ordinary skill in the art to which the disclosure pertains. Terms, such as those defined in commonly used dictionaries, should be construed as having a meaning that is consistent with their meaning in the context of the relevant art and are not to be construed in an idealized or overly formal sense unless expressly so defined herein.

Hereinafter, an embodiment will be described in detail with reference to the accompanying drawings while like reference numerals will be given to the same or corresponding elements regardless of signs in the drawings and overlapping descriptions thereof will be omitted.

Figure 2:
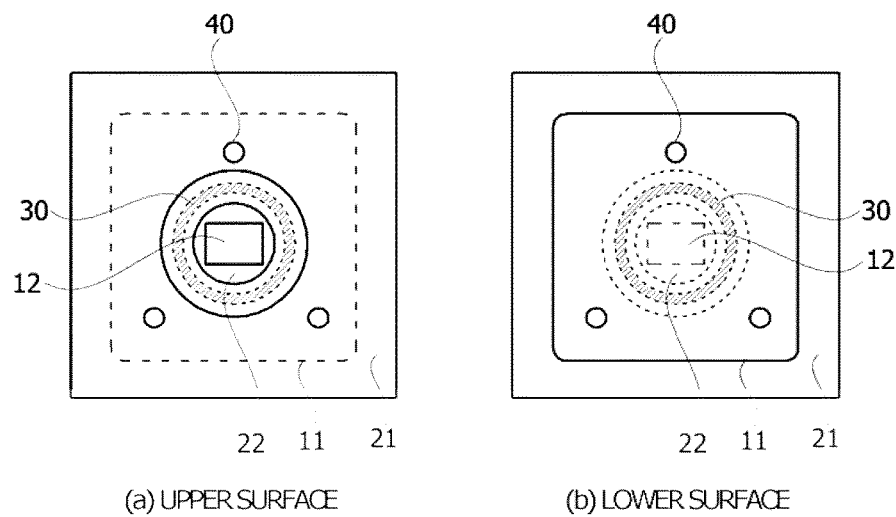
FIG. 2 is a view illustrating an upper surface and a lower surface of the camera module according to an embodiment of the present disclosure.

FIG. 1 is a lateral cross-sectional view schematically illustrating a camera module according to an embodiment of the present disclosure, and FIG. 2 is a view illustrating an upper surface and a lower surface of the camera module according to an embodiment of the present disclosure.

Referring to FIGS. 1 and 2, the camera module according to an embodiment of the present disclosure may include an image sensor unit 10 and a lens unit 20.

The image sensor unit 10 may include a substrate 11 and an image sensor 12.

The substrate is electrically connected to the image sensor 12 via a printed circuit board (PCB).

The image sensor 12 is arranged on the substrate 11.

The image sensor 12 serves to receive light corresponding to image information of an object through the lens unit 20 and convert the received light into an electrical signal. Although not limited thereto, the image sensor 12 may include a metal-oxide semiconductor (MOS), a charge coupled device (CCD), etc.

The lens unit 20 is arranged on the image sensor 12.

The lens unit 20 may include a lens housing 21 and at least one lens 22.

The lens housing 21 is arranged on the substrate 11.

A through-hole 211 to which the lens 22 is coupled is formed inside the lens housing 21. In addition, a support part 212 that supports the lens 22 may protrude toward an inside of the through-hole 211 in the lens housing 21. In this structure, the lens 22 is inserted into the through-hole 211 to be arranged on the image sensor 12 and is supported by the support part 212 of the lens housing 21.

A waterproof member 23 may be arranged between the support part 221 and the lens 22.

The waterproof member 23 is a member which prevents water from flowing into an optical path from the lens 22 toward the image sensor 12, i.e., the through-hole 211 of the lens housing 21, and may be provided as a waterproof material such as rubber. Although not limited thereto, the waterproof member 23 may be provided as rubber in a ring shape.

An elastic member 30 may be arranged between the image sensor unit 10 and the lens unit 20. The elastic member 30 may be arranged between the substrate 11 and the lens housing 21.

The elastic member 30 acts against fastening forces of fastening members 40 and serves to maintain a gap between the substrate 11 and the lens housing 21.

The elastic member 30 may be provided as an elastic material such as rubber and may be provided in various shapes such as a ring shape that supports a portion between the lens housing 21 and the substrate 11.

Although not limited thereto, the elastic member 30 may be ring-shaped rubber.

When the elastic member 30 is a rubber ring, due to a waterproof function of the rubber ring, a waterproof structure that prevents water from flowing into the optical path from the lens 22 toward the image sensor 12 may be formed.

The image sensor 10 and the lens unit 20 may be coupled to each other by a plurality of fastening members 40.

A plurality of through-holes formed at different positions are formed at the substrate 11 of the image sensor unit 10 and the lens housing 21 of the lens unit 20. Each of the fastening members 40 sequentially couples to the through-holes formed at the substrate 11 and the lens housing 21 to fasten the image sensor unit 10 and the lens unit 20 to each other.

The fastening members 40 may have a screw shape and be coupled to the substrate 11 and the lens housing 21 by a screw.

Since each of the fastening members 40 is fastened to the substrate 11 and the lens housing 21, the fastening forces of the fastening members 40 act in a direction which reduces the gap between the substrate 11 and the lens housing 21 in an adjacent area. Here, the gap between the substrate 11 and the lens housing 21 adjusted by the fastening members 40 may be maintained by an elasticity of the elastic member 30.

Since the fastening members 40 are fastened to different positions, the fastening forces of the fastening members 40 affect different areas. Consequently, a degree of fastening of each of the fastening members 40 may be adjusted to adjust the gap between the lenses 22 and the image sensor 12. Accordingly, tilt alignment between the image sensor 12 and the lenses 22 is possible.

When the alignment is finished, the fastening members 40 may be fixed to the substrate 11 or the lens housing 21 in their current states by a molding member (refer to a reference number 50 in FIG. 4), a nut, etc. In this specification, a molding member, a nut, etc. may be used with a fixing member.

Meanwhile, although a case in which three fastening members 40 fastened to different positions for an active alignment are used is illustrated as an example in FIG. 2, an embodiment of the present disclosure is not limited thereto. The number of the fastening members 40 fastened to different positions for an active alignment may be more or less than three.

Meanwhile, when three fastening members are used as illustrated in FIG. 2, it is possible to secure six degrees of freedom in the camera module.

Figure 3:
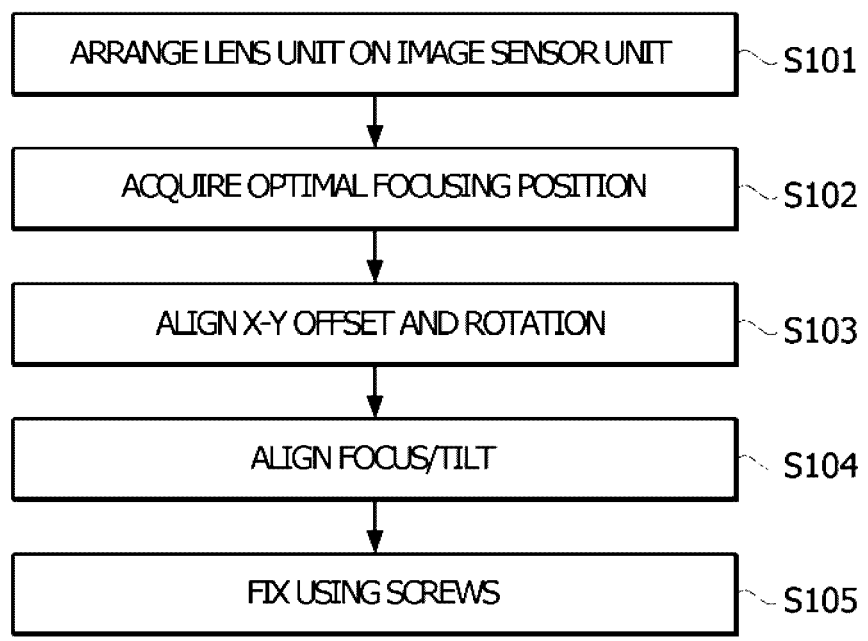
FIG. 3 is a flowchart illustrating an alignment method of the camera module according to an embodiment of the present disclosure.
Figure 4:
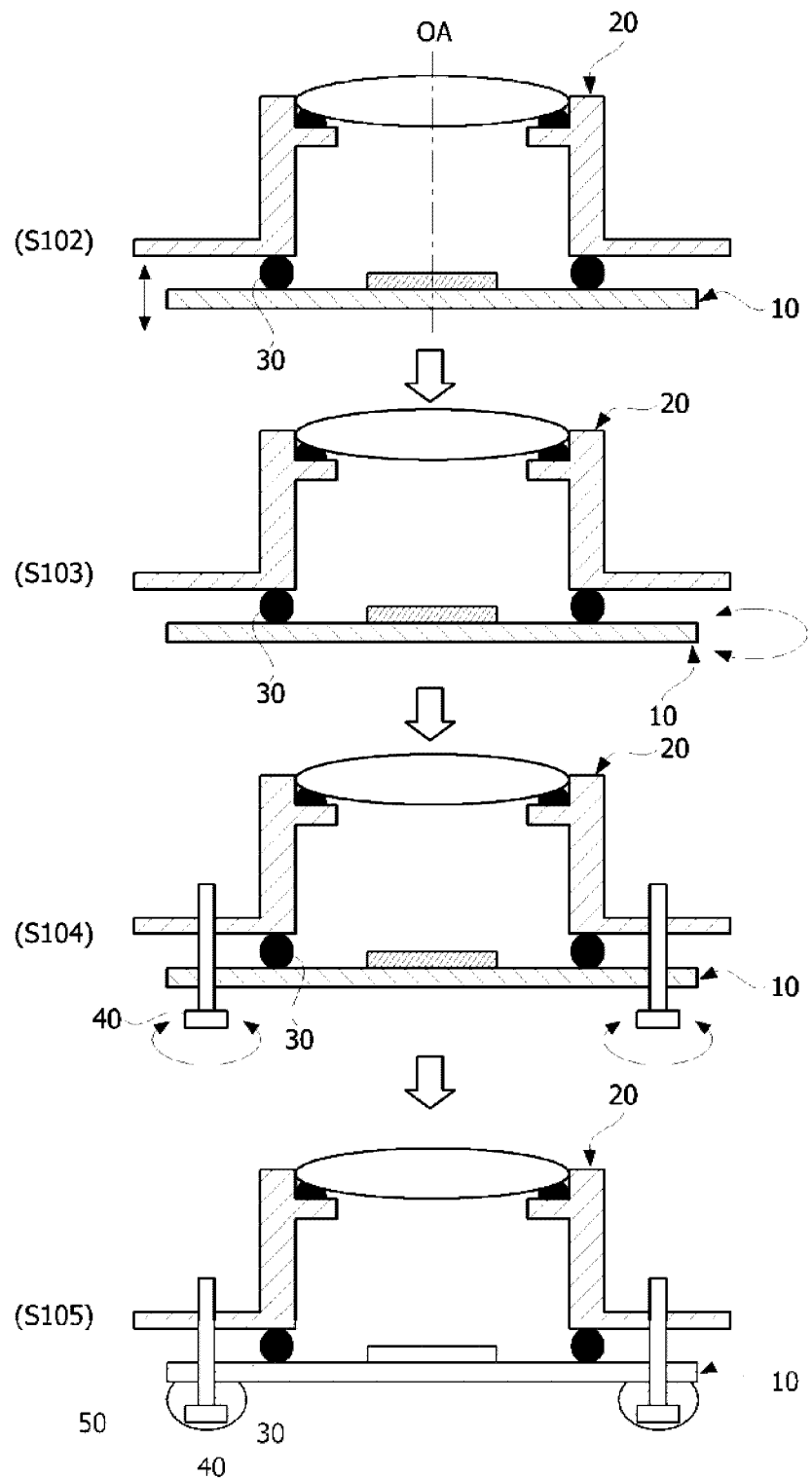
FIG. 4 is a view for describing the alignment method of the camera module according to an embodiment of the present disclosure.

FIG. 3 is a flowchart illustrating an active alignment method of the camera module according to an embodiment of the present disclosure, and FIG. 4 is a view illustrating an embodiment in which the camera module according to an embodiment of the present disclosure is actively aligned.

Referring to FIGS. 3 and 4, the lens unit 20 is arranged on the image sensor unit 10 (S101). In Step S101, the elastic member 30 is arranged between the image sensor unit 10 and the lens unit 20.

Next, while moving a substrate in a vertical direction, i.e., toward an optic axis (OA), a focusing position which is a six-axis optimal point is checked, and the substrate 11 is aligned at the focusing position (S102).

When the substrate 11 is aligned at the optimal focusing position, an x-y offset of the substrate 11 is aligned while moving the substrate 11 in a horizontal direction, i.e., a direction perpendicular to the OA. Also, the substrate 11 is rotated and aligned while rotating the substrate 11 about the OA (S103).

Next, the plurality of fastening members 40 are fastened to the substrate 11 and the lens housing 21, and the fastening of each of the fastening members 40 is adjusted to align a focus and a tilt of the substrate 11 (S104).

As the x-y offset, the rotation, the focusing, and the tilt alignment are finished as described above, the alignment is finished by fixing each of the fastening members 40 in their current state (S105). In Step S105, each of the fastening members 40 may be fixed in its current state using various methods. For example, after the alignment is finished, each of the fastening members 40 may be fixed in its current state by a molding member as illustrated in FIG. 4. In addition, for example, each of the fastening members 40 may be fixed in its current state by a nut (not shown) fastened thereto.

According to the embodiment of the present disclosure described above, a camera module capable of being actively aligned and resistant to vibration and impact may be provided using fastening members that adjust a gap between an image sensor unit and a lens unit and an elastic member that supports the gap between the image sensor unit and the lens unit. Also, by forming a waterproof structure using the elastic member, there is an effect of improving a waterproof function of the camera module.

Although the present disclosure has been described with reference to the exemplary embodiment of the present disclosure, those of ordinary skill in the art should understand that the present disclosure may be modified and changed in various ways within a scope that does not depart from the spirit and area of the present disclosure described in the claims below.

The invention claimed is:

1. A camera module comprising:
a substrate including a plurality of through-holes;
an image sensor arranged on the substrate;
a lens housing arranged on the substrate and into which a lens is coupled, wherein the lens housing includes a plurality of through-holes;
an elastic member arranged between the substrate and the lens housing; and
a plurality of fastening members configured to fasten the substrate and the lens housing to each other, wherein each of the plurality of fastening members extends through and couples to a respective through-hole of the substrate and the lens housing,
wherein the lens, the elastic member and the plurality of fastening members do not overlap in an optical axis,
wherein the plurality of fastening members have lengths longer in the optical axis direction than the elastic member,
wherein the elastic member provides a gap between the substrate and the lens housing, and
wherein the gap is adjusted by adjusting the degree of fastening of each of the fastening members to perform tilt alignment between the image sensor and the lens.

2. The camera module of claim 1, wherein the elastic member includes rubber.

3. The camera module of claim 2, wherein the elastic member may have a ring shape.

4. The camera module of claim 1, wherein the plurality of fastening members couple the substrate and the lens housing to each other at different positions.

5. The camera module of claim 4, wherein the fastening members have a screw shape.

6. The camera module of claim 1, wherein the lens housing includes a support part configured to support the lens, and further includes a waterproof member arranged between the lens and the support part.

7. The camera module of claim 6, wherein the support part protrudes toward an inside of the lens housing.

8. The camera module of claim 1, further comprising a molding member configured to fix the plurality of fastening members to the substrate.

9. An alignment method of a camera module, the method comprising:
arranging an elastic member between an image sensor arranged on a substrate and a lens housing into which a lens is coupled, wherein the elastic member provides a gap between the substrate and the lens housing, and wherein the substrate and the lens housing are provided with a plurality of through-holes;
moving at least one of the substrate and the lens housing towards an optical axis (OA);
rotating at least one of the substrate and the lens housing in a direction perpendicular to the OA;
fastening the substrate and the lens housing to each other using a plurality of fastening members, wherein the plurality of fastening members extend through and couple to a respective through-hole of the substrate and the lens housing; and
adjusting the gap between the substrate and the lens housing by adjusting the degree of fastening of each of the fastening members to perform tilt alignment between the image sensor and the lens,
wherein the lens, the elastic member and the plurality of fastening members do not overlap in the optical axis, and
wherein the plurality of fastening members have lengths longer in the optical axis direction than the elastic member.

10. The method of claim 9, further comprising adjusting a focus of the camera module by moving at least one of the substrate and the lens housing toward the OA.

11. The method of claim 9, further comprising aligning an x-y offset by rotating at least one of the substrate and the lens housing in the direction perpendicular to the OA.

12. The method of claim 9, further comprising fixing the fastening members in place using a molding member.

* * * * *